(12) United States Patent
Lin et al.

(10) Patent No.: US 12,236,192 B2
(45) Date of Patent: Feb. 25, 2025

(54) TASK-SPECIFIC TEXT GENERATION BASED ON MULTIMODAL INPUTS

(71) Applicant: Meta Platforms, Inc., Menlo Park, CA (US)

(72) Inventors: Xudong Lin, New York, NY (US); Gediminas Bertasius, Boston, MA (US); Jue Wang, Cambridge, MA (US); Devi Niru Parikh, Menlo Park, CA (US); Lorenzo Torresani, Norwich, VT (US)

(73) Assignee: Meta Platforms, Inc., Menlo Park, CA (US)

( * ) Notice: Subject to any disclaimer, the term of this patent is extended or adjusted under 35 U.S.C. 154(b) by 464 days.

(21) Appl. No.: 17/339,759

(22) Filed: Jun. 4, 2021

(65) Prior Publication Data
US 2022/0222435 A1    Jul. 14, 2022

Related U.S. Application Data

(60) Provisional application No. 63/135,456, filed on Jan. 8, 2021.

(51) Int. Cl.
*G06F 40/284* (2020.01)
*G06F 40/30* (2020.01)
(Continued)

(52) U.S. Cl.
CPC .......... *G06F 40/284* (2020.01); *G06F 40/30* (2020.01); *G06N 3/084* (2013.01); *G06N 7/01* (2023.01)

(58) Field of Classification Search
CPC ...... G06F 40/284; G06F 18/213; G06F 40/30; G06F 16/3329; G06F 16/35;
(Continued)

(56) References Cited

U.S. PATENT DOCUMENTS

2019/0138882 A1* 5/2019 Choi .................. G06N 3/048

OTHER PUBLICATIONS

Jacob Devlin, Ming-Wei Chang, Kenton Lee, and Kristina Toutanova. Bert: Pre-training of deep bidirectional transformers for language understanding. arXiv preprint arXiv:1810.04805. (Cited portions of text) (Year: 2018).*

(Continued)

*Primary Examiner* — Hai Phan
*Assistant Examiner* — Ian Scott McLean
(74) *Attorney, Agent, or Firm* — BakerHostetler

(57) ABSTRACT

A system and method for generating task-specific text by processing multimodal inputs using machine-learning models is provided. The method may include accessing first sets of tokens associated with a desired task and one or more modalities associated with a context of the desired task. The method may further include determining a second set of tokens for each of the one or more modalities using a classifier network associated with the modality. The method may further include generating a number of embedding vectors by mapping the first sets of tokens and the second set of tokens associated with each of the one or more modalities to an embedding space. The method may further include producing a sequence of words addressing the desired task by processing the number of embedding vectors with an encoder-decoder network.

20 Claims, 9 Drawing Sheets

(51) Int. Cl.
G06N 3/084 (2023.01)
G06N 7/01 (2023.01)

(58) Field of Classification Search
CPC ........ G06F 40/242; G06N 3/084; G06N 7/01; G06N 3/045; G06N 3/048
USPC .......................................................... 704/9
See application file for complete search history.

(56) References Cited

OTHER PUBLICATIONS

Feigl, Tobias, et al. "A bidirectional LSTM for estimating dynamic human velocities from a single IMU." 2019 International Conference on Indoor Positioning and Indoor Navigation (IPIN). IEEE,. (Cited portions of text) (Year: 2019).*
V. Y. Wu, Y. Wang, S. Zhang and H. Ogai, "Deep 3D Object Detection Networks Using LiDAR Data: A Review," in IEEE Sensors Journal, vol. 21, No. 2, pp. 1152-1171, Jan. 15, 2015, 2021, doi: 10.1109/JSEN.2020.3020626. (Year: 2020).*
Y. Wu, Y. Wang, S. Zhang and H. Ogai, "Deep 3D Object Detection Networks Using LiDAR Data: A Review," in IEEE Sensors Journal, vol. 21, No. 2, pp. 1152-1171, Jan. 15, 2015, 2021, doi: 10.1109/JSEN.2020.3020626. (Year: 2020).*
Li, Liunian Harold, et al. "Visualbert: A simple and performant baseline for vision and language." arXiv preprint arXiv:1908.03557 (Cited portions of text) (Year: 2019).*
Lu Jiasen, Batra Dhruv, Parikh Devi, and Lee Lee. ViLBERT: Pretraining task-agnostic visiolinguistic representations for vision-and-language tasks. arXiv preprint arXiv:1908.02265. (Cited portions of text) (Year: 2019).*
Radford, A., Narasimhan, K., Salimans, T., & Sutskever, I.(2018). Improving language Understanding by Generative Pre-training. OpenAI Technical Report (Year: 2018).*
Vaswani, Ashish, et al. "Attention is all you need." Advances in neural information processing systems 30 (Year: 2017).*
Li, Xiujun et al. "Oscar: Object-Semantics Aligned Pre-training for Vision-Language Tasks." ArXiv abs/2004.06165 (Cited Portions of text) (Year: 2020).*
Huang G., et al., "Multimodal Pretraining for Dense Video Captioning," Cornell University Library, Nov. 10, 2020, 21 pages.
Yang Z., et al., "BERT Representations for Video Question Answering," In The IEEE Winter Conference on Applications of Computer Vision, 2020, pp. 1556-1565.
Yin X., et al., "OBJ2TEXT: Generating Visually Descriptive Language from Object Layouts," arXiv preprint arXiv:1707.07102, 2017, 11 pages.
Yu L., et al., "Visual Madlibs: Fill in the blank Image Generation and Question Answering," arXiv preprint arXiv:1506.00278, 2015, 10 pages.
Zhou L., et al., "Towards Automatic Learning of Procedures from Web Instructional Videos," arXiv preprint arXiv:1703.09788, 2017, 10 pages.
Zhou L., et al., "Unified Vision-Language Pre-Training for Image Captioning and VQA," arXiv:1909.11059, 2019, 10 pages.
Zhu L., et al., "ActBERT: Learning Global-Local Video-Text Representations," In Proceedings of the IEEE/CVF Conference on Computer Vision and Pattern Recognition (CVPR), Jun. 2020, pp. 8746-8755.
Zhu Y., et al., "Visual7W: Grounded Question Answering in Images," In Proceedings of the IEEE conference on computer vision and pattern recognition, 2016, pp. 4995-5004.
Alamri H., et al., "Audio Visual Scene-Aware Dialog (AVSD) Challenge at DSTC7," arXiv preprint arXiv:1806.00525, 2018, 2 pages.
Alamri H., et al., "Audio Visual Scene-Aware Dialog," In Proceedings of the IEEE Conference on Computer Vision and Pattern Recognition, 2019, pp. 7558-7567.

Anderson P., et al., "Bottom-Up and Top-Down Attention for Image Captioning and Visual Question Answering," In Proceedings of the IEEE conference on computer vision and pattern recognition, 2018, pp. 6077-6086.
Anderson P., et al., "Vision-and-Language Navigation: Interpreting Visually-Grounded Navigation Instructions in Real Environments," In Proceedings of the IEEE Conference on Computer Vision and Pattern Recognition (CVPR), Jun. 2018, pp. 3674-3683.
Anonymous., "Vx2TEXT: End-to-End Learning of Video-Based Text Generation From Multimodal Inputs," CVPR, 2021, Paper ID 5443, pp. 1-11.
Antol S., et al., "VQA: Visual Question Answering," In Proceedings of the IEEE International Conference on Computer Vision, 2015, pp. 2425-2433.
Ba J.L., et al., "Layer Normalization," arXiv preprint arXiv: 1607.06450, 2016, 14 pages.
Banerjee S., et al., "METEOR: An Automatic Metric for MT Evaluation with Improved Correlation with Human Judgments," Proceedings of the ACL workshop on intrinsic and extrinsic evaluation measures for machine translation and/or summarization, Jun. 2005, pp. 65-72.
Bengio Y., et al., "Estimating or Propagating Gradients Through Stochastic Neurons for Conditional Computation," arXiv preprint arXiv:1308.3432, 2013, 12 pages.
Carreira J., et al., "Quo Vadis, Action Recognition? A New Model and The Kinetics Dataset," Proceedings of the IEEE Conference on Computer Vision and Pattern Recognition (CVPR), 2017, pp. 6299-6308.
Chen X., et al., "Microsoft COCO Captions: Data Collection and Evaluation Server," arXiv preprint arXiv:1504.00325, 2015, 7 pages.
Das A., et al., "Visual Dialog," In Proceedings of the IEEE Conference on Computer Vision and Pattern Recognition, 2017, pp. 326-335.
Devlin J., et al., "BERT: Pre-Training of Deep Bidirectional Transformers for Language Understanding," arXiv preprint arXiv:1810.04805, 2018, 14 pages.
Gao H., et al., "Are You Talking to a Machine? Dataset and Methods for Multilingual Image Question," In Advances in neural information processing systems, 2015, pp. 2296-2304.
Gemmeke J.F, et al., "Audio Set: An Ontology and Human-Labeled Dataset for Audio Events," In 2017 IEEE International Conference on Acoustics, Speech and Signal Processing (ICASSP), 2017, pp. 776-780.
Ghadiyaram D., et al., "Largescale Weakly-Supervised Pre-Training for Video Action Recognition," In Proceedings of the IEEE Conference on Computer Vision and Pattern Recognition, 2019, pp. 12046-12055.
Hori C., et al., "End-to-End Audio Visual Scene-Aware Dialog using Multimodal Attention-Based Video Features," 2019 IEEE International Conference on Acoustics, Speech and Signal Processing (ICASSP), IEEE, 2019, pp. 2352-2356.
Jang E., et al., "Categorical Reparameterization with Gumbel-Softmax," arXiv preprint arXiv:1611.01144, 2016, 12 pages.
Jang Y., et al., "TGIF-QA: Toward Spatio-Temporal Reasoning in Visual Question Answering," In Proceedings of the IEEE Conference on Computer Vision and Pattern Recognition, 2017, pp. 2758-2766.
Kim J., et al., "Modality Shifting Attention Network for Multimodal Video Question Answering," In Proceedings of the IEEE/CVF Conference on Computer Vision and Pattern Recognition, 2020, pp. 10106-10115.
Kong Q., et al., "PANNs: Large-Scale Pretrained Audio Neural Networks for Audio Pattern Recognition," IEEE/ACM Transactions on Audio, Speech, and Language Processing, vol. 28, 2020, pp. 2880-2894.
Kool W., et al., "Stochastic Beams and Where to Find Them: The Gumbel-Top-k Trick for Sampling Sequences Without Replacement," Proceedings of the 36th International Conference on Machine Learning, arXiv preprint arXiv:1903.06059, 2019, 13 pages.
Kottur S., et al., "Visual Coreference Resolution in Visual Dialog Using Neural Module Networks," In Proceedings of the European Conference on Computer Vision (ECCV), 2018, pp. 153-169.

(56) References Cited

OTHER PUBLICATIONS

Krishna R., et al., "Dense-Captioning Events in Videos," In Proceedings of the IEEE international conference on computer vision, 2017, pp. 706-715.
Le H., et al., "Multimodal Transformer Networks for End-to-End Video-Grounded Dialogue Systems," In Proceedings of the 57th Annual Meeting of the Association for Computational Linguistics, 2019, pp. 5612-5623.
Lei J., et al., "TVQA: Localized, Compositional Video Question Answering," Department of Computer Science, arXiv preprint arXiv:1809.01696, 2018, 13 pages.
Lei J., et al., "TVQA+: Spatio-Temporal Grounding for Video Question Answering," arXiv preprint arXiv:1904.11574, 2019, 13 pages.
Lei J., et al., "TVR: A Large-Scale Dataset for Video-Subtitle Moment Retrieval," arXiv preprint arXiv:2001.09099, 2020, 35 pages.
Li L., et al., "HERO: Hierarchical Encoder for Video+Language Omni-Representation Pre-Training," arXiv preprint arXiv:2005.00200, 2020, 21 pages.
Li W., et al., "TMT: A Transformer-based Modal Translator for Improving Multimodal Sequence Representations in Audio Visual Scene-aware Dialog," arXiv preprint arXiv:2010.10839, 2020, 5 pages.
Lin C.Y., "ROUGE: A Package for Automatic Evaluation of Summaries," In Text Summarization Branches Out, 2004, pp. 74-81.
Lu J., et al., "Hierarchical Question-Image Co-Attention for Visual Question Answering," In Advances in neural Information processing systems, 2016, pp. 289-297.
Lu J., et al., "ViLBERT: Pretraining Task-Agnostic Visiolinguistic Representations for Vision-and-Language Tasks," In Advances in Neural Information Processing Systems, 2019, 11 pages.
Luo H., et al., "UniViLM: A Unified Video and Language Pre-Training Model for Multimodal Understanding and Generation," arXiv preprint arXiv:2002.06353, 2020, 15 pages.
Maharaj T., et al., "A Dataset and Exploration of Models for Understanding Video Data through Fill-in-the Blank Question-Answering," In Proceedings of the IEEE Conference on Computer Vision and Pattern Recognition, 2017, pp. 6884-6893.
Papineni K., et al., "BLEU: A Method for Automatic Evaluation of Machine Translation," Proceedings of the 40th Annual Meeting of the Association for Proceedings of the 40th Annual Meeting of the Association for (ACL), Jul. 2002, pp. 311-318.
Plummer B.A., et al., "Flickr30k Entities: Collecting Region-to-Phrase Correspondences for Richer Image-to-Sentence Models," In Proceedings of the IEEE international conference on computer vision, 2015, pp. 2641-2649.
Radford A., et al., "Improving Language Understanding by Generative Pre-Training," 2018, 12 pages.
Raffel C., et al., "Exploring the Limits of Transfer Learning with a Unified Text-to-Text Transformer," arXiv preprint arXiv:1910.10683, 2019, 53 pages.
Schwartz I., et al., "A Simple Baseline for Audio-Visual Scene-Aware Dialog," In Proceedings of the IEEE Conference on Computer Vision and Pattern Recognition, 2019, pp. 12548-12558.
Shah M., et al., "Cycle-Consistency for Robust Visual Question Answering," In Proceedings of the IEEE conference on computer vision and pattern recognition, 2019, pp. 6649-6658.
Sigurdsson G.A., at al., "Hollywood in Homes: Crowdsourcing Data Collection for Activity Understanding," In ECCV, 2016, 17 pages.
Sun C., et al., "VideoBERT: A Joint Model for Video and Language Representation Learning," 2019 IEEE/CVF International Conference on Computer Vision (ICCV), 2019, pp. 7463-7472.
Tan H., et al., "LXMERT: Learning Cross-Modality Encoder Representations from Transformers," In Proceedings of the 2019 Conference on Empirical Methods in Natural Language Processing, 2019, pp. 5100-5111.
Tapaswi M., et al., "MovieQA: Understanding Stories in Movies through Question-Answering," In Proceedings of the IEEE conference on computer vision and pattern recognition, 2016, pp. 4631-4640.
Tran D., et al., "A Closer Look at Spatiotemporal Convolutions for Action Recognition," Proceedings of the IEEE Conference on Computer Vision and Pattern Recognition (CVPR), 2018, pp. 6450-6459.
Vedantam R., et al., "CIDEr: Consensus-based Image Description Evaluation," In Proceedings of the IEEE conference on computer vision and pattern recognition, 2015, pp. 4566-4575.
Williams R.J., et al., "A Learning Algorithm for Continually Running Fully Recurrent Neural Networks," Neural Computation, 1989, Vo. 1(2), pp. 270-280.
Wolf T., et al., "HuggingFace's Transformers: State-of-the-art Natural Language Processing," arXiv:1910.03771, 2019, 11 pages.
Xu J., et al., "MSR-VTT: A Large Video Description Dataset for Bridging Video and Language," Proceedings of the IEEE Conference on Computer Vision and Pattern Recognition (CVPR), 2016, pp. 5288-5296.

\* cited by examiner

| Models | Use Caption? | CIDEr | BLEU-4 | BLEU-3 | BLEU-2 | BLEU-1 | ROUGE-L | METEOR |
|---|---|---|---|---|---|---|---|---|
| MA-VDS | No | 0.727 | 0.078 | 0.109 | 0.161 | 0.256 | 0.277 | 0.113 |
| Simple | No | 0.905 | 0.095 | 0.130 | 0.183 | 0.279 | 0.303 | 0.122 |
| VX2TEXT (Ours) | No | 1.357 | 0.127 | 0.166 | 0.222 | 0.317 | 0.356 | 0.152 |
| MTN | Yes | 1.249 | 0.128 | 0.173 | 0.241 | 0.357 | 0.355 | 0.162 |
| MTN-TMT | Yes | 1.357 | 0.142 | - | - | - | 0.371 | 0.171 |
| VX2TEXT (Ours) | Yes | 1.605 | 0.154 | 0.197 | 0.260 | 0.361 | 0.393 | 0.178 |

*FIG. 6A*

| Models | # Samples for Multimodal Pretext | Val | Test |
|---|---|---|---|
| HERO | 7.6M | 74.8 | 73.6 |
| TVQA | 0 | 67.7 | 68.5 |
| STAGE | 0 | 70.5 | 70.2 |
| HERO | 0 | 70.7 | 70.3 |
| MSAN | 0 | 71.6 | 71.1 |
| BERT QA | 0 | 72.4 | 72.7 |
| VX2TEXT (Ours) | 0 | 74.9 | 75.0 |

*FIG. 6B*

| Models | # Samples for Multimodal Pretext | Validation | | | | Test | | | |
|---|---|---|---|---|---|---|---|---|---|
| | | CIDEr | BLEU-4 | ROUGE-L | METEOR | CIDEr | BLEU-4 | ROUGE-L | METEOR |
| HERO | 7.6M | 0.505 | 0.113 | 0.341 | 0.175 | 0.500 | 0.124 | 0.342 | 0.176 |
| MMT | 0 | 0.444 | 0.105 | 0.324 | 0.166 | 0.454 | 0.109 | 0.328 | 0.169 |
| HERO | 0 | 0.436 | 0.107 | 0.327 | 0.164 | 0.437 | 0.109 | 0.326 | 0.168 |
| VX2TEXT (Ours) | 0 | 0.482 | 0.116 | 0.328 | 0.172 | 0.483 | 0.119 | 0.331 | 0.174 |

*FIG. 6C*

TASK-SPECIFIC TEXT GENERATION BASED ON MULTIMODAL INPUTS

PRIORITY

This application claims the benefit under 35 U.S.C. § 119(e) of U.S. Provisional Patent Application No. 63/135,456, filed 8 Jan. 2021, which is incorporated herein by reference.

TECHNICAL FIELD

This disclosure generally relates to machine-learning techniques, and in particular relates to generating task-specific text by processing multimodal inputs using machine-learning models.

BACKGROUND

Artificial neural networks (ANNs), usually simply called neural networks (NNs), are computing systems vaguely inspired by the biological neural networks that constitute animal brains. An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times. Generative Adversarial Networks (GANs) are a type of the ANNs that generate new data, such as a new image, based on input data.

SUMMARY OF PARTICULAR EMBODIMENTS

Particular embodiments described herein relate to systems and methods for generating a sequence of words addressing a desired task based on one or more sets of tokens associated with the desired task and one or more sensor data associated with a context of the desired task, where each of the one or more sensor data is generated by a distinctive sensor. The desired task is generating a context of an event in a desired form. Each of the one or more sensor data is converted into a set of tokens. Each set of tokens is converted into one or more embedding vectors in a multi-dimensional language embedding space by a learnable tokenizer. By doing this, multi-modal inputs may be fused in the language embedding space. To address the non-differentiability of tokenization on continuous sensor data (e.g., video or audio), a differentiable tokenization module is introduced, which enables end-to-end training of machine-learning models within the framework. While previous approaches utilize encoder-only models, the framework introduced in this invention includes an autoregressive decoder to generate open-ended text from the plurality of embedding vectors fused by a language encoder. The framework is fully generative and capable of generating a sequence of words for various desired tasks without a need to design a specialized network head for each desired task. Experiments of the framework disclosed herein demonstrate that the framework disclosed herein outperforms the state-of-the-art on three video-based text-generation tasks: captioning, question answering and audio-visual scene-aware dialog.

In particular embodiments, a computing device may access one or more first sets of tokens associated with a desired task and one or more modalities associated with a context of the desired task. The desired task may comprise a caption describing an event, an answer to a given question related to the event, a question relative to the event, a context-aware dialog, or any suitable task. The one or more modalities may comprise video sensor data, audio sensor data, Inertial Measurement Unit (IMU) sensor data, light detection and ranging (lidar) sensor data, or any suitable sensor data. The computing device may determine a second set of tokens for each of the one or more modalities using a classifier network associated with the modality. Determining a set of tokens for each of the one or more modalities may comprise sampling one or more categories corresponding to the modality among a plurality of categories based on a probability distribution for the plurality of categories. The sampling may be performed by a differentiable tokenization unit. The probability distribution for the plurality of categories may be generated by processing the modality with a classifier network associated with the modality. The sampling may comprise a categorical reparameterization with Gumbel-Softmax or a differentiable approximation of tokenization.

In particular embodiments, the computing device may generate a plurality of embedding vectors by mapping the one or more first sets of tokens and the second set of tokens associated with each of the one or more modalities to an embedding space. Mapping a set of tokens belonging to a modality to one or more embedding vectors in a d-dimensional embedding space may comprise looking up an embedding table corresponding to the modality. In particular embodiments, a first embedding table corresponding to a first modality may be different from a second embedding table corresponding to a second modality. Each of the plurality of embedding vectors may have a pre-determined relative position among the plurality of embedding vectors.

In particular embodiments, the computing device may produce a sequence of words addressing the desired task by processing the plurality of embedding vectors with an encoder-decoder network. An encoder of the encoder-decoder network may generate a latent representation by processing the plurality of embedding vectors. A decoder of the encoder-decoder network may produce a word at a time by processing the latent representation. The produced word may be selected from a word dictionary based on a probability associated with each word in the dictionary. The decoder may take $1^{st}$ to $k^{th}$ produced word as input for producing a $k+1^{st}$ word in the sequence of words.

In particular embodiments, the computing device may train the entire networks including classifier networks associated with the one or more modalities, embedding tables associated with each set of tokens, and the encoder-decoder network. At a beginning of a training procedure, each classifier network associated with each of the one or more modalities, each embedding table corresponding to each set of tokens, and the encoder-decoder network may be initialized with pre-trained models. During the training procedure, the classifier networks, the embedding tables, and the encoder-decoder network may be updated through backward propagations. During the backward propagations, a gradient for each of the plurality of categories for each of the one or more modalities may be estimated using a Straight-Through Estimator. A loss may be calculated based on a comparison between a ground-truth sequence of words addressing the desired task with a sequence of words generated by the decoder of the encoder-decoder network. A partial loss for a $k^{th}$ word may be calculated based on a comparison between a $k^{th}$ word in the ground-truth sequence of words and a $k^{th}$ generated word when a sub-sequence of words from a first word to a k-$1^{st}$ word in the ground truth sequence is provided to the decoder as input.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6A illustrates comparative results on Audio-Visual Scene-Aware Dialog.

FIG. 6B illustrates comparative results on Video Question Answering.

FIG. 6C illustrates comparative results on Video Captioning.

DESCRIPTION OF EXAMPLE EMBODIMENTS

Figure 1:
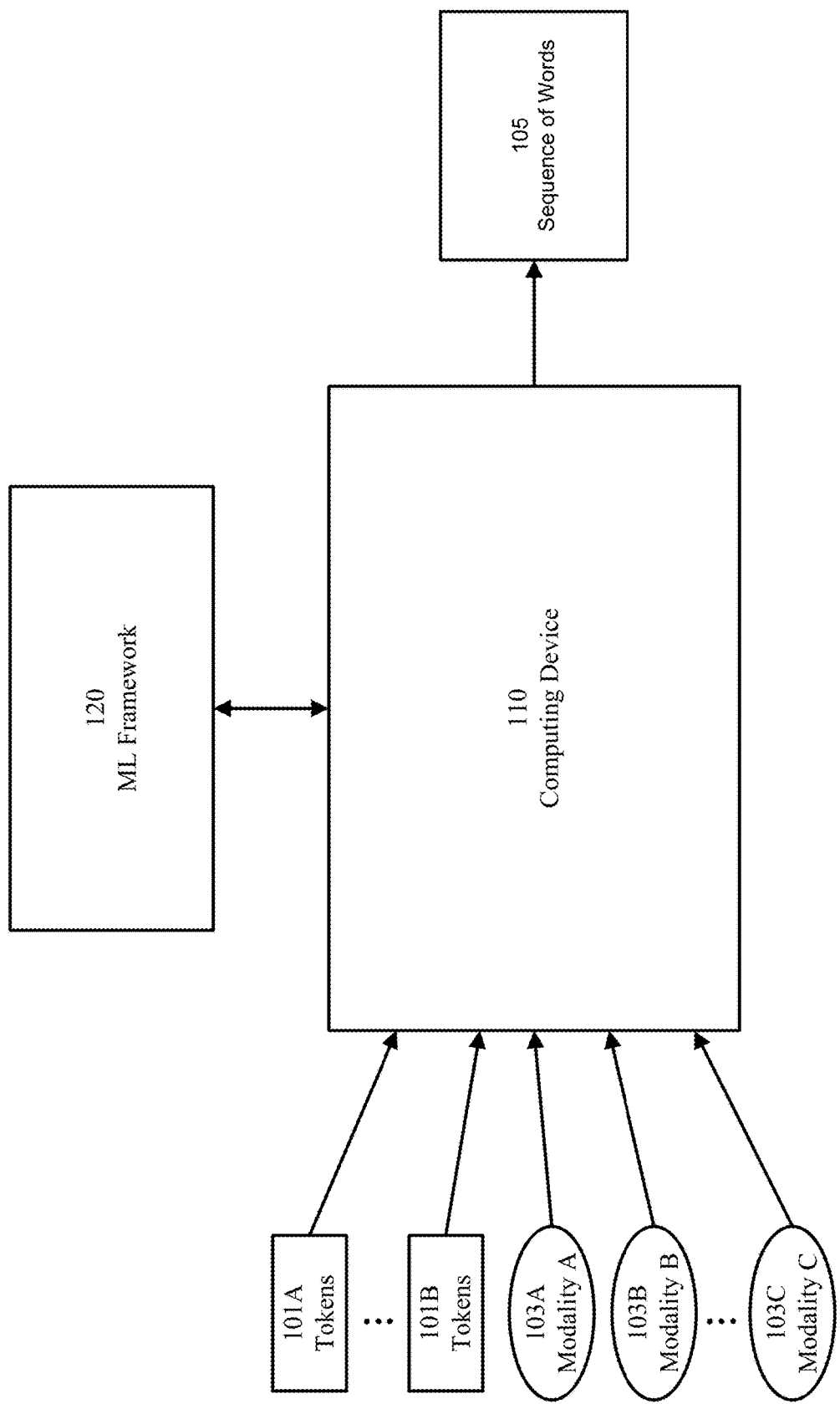
FIG. 1 illustrates an example architecture for generating a sequence of words addressing a desired task based on multi-modal inputs associated with an event.

FIG. 1 illustrates an example architecture for generating a sequence of words addressing a desired task based on multi-modal inputs associated with an event. A computing device 110 may access multi-modal inputs associated with an event. The multi-model inputs may comprise one or more sets of tokens 101A and 101B associated with the desired task and one or more modalities 103A, 103B, and 103C associated with a context of the desired task. The one or more sets of tokens may comprise a set of tokens determining the desired task. The one or more modalities 103A, 103B and 103C may comprise data captured by various sensors associated with the computing device 110. The one or more modalities 103A, 103B and 103C may include video sensor data, audio sensor data, Inertial Measurement Unit (IMU) sensor data, light detection and ranging (lidar) sensor data, or any suitable sensor data. The computing device 110 may process the accessed multi-modal inputs with a machine-learning framework 120 to generate a sequence of words 105 addressing the desired task. Although this disclosure describes a particular architecture for generating a sequence of words addressing a desired task based on multi-modal inputs associated with an event, this disclosure contemplates any suitable architecture for generating a sequence of words addressing a desired task based on multi-modal inputs associated with an event.

Figure 2:
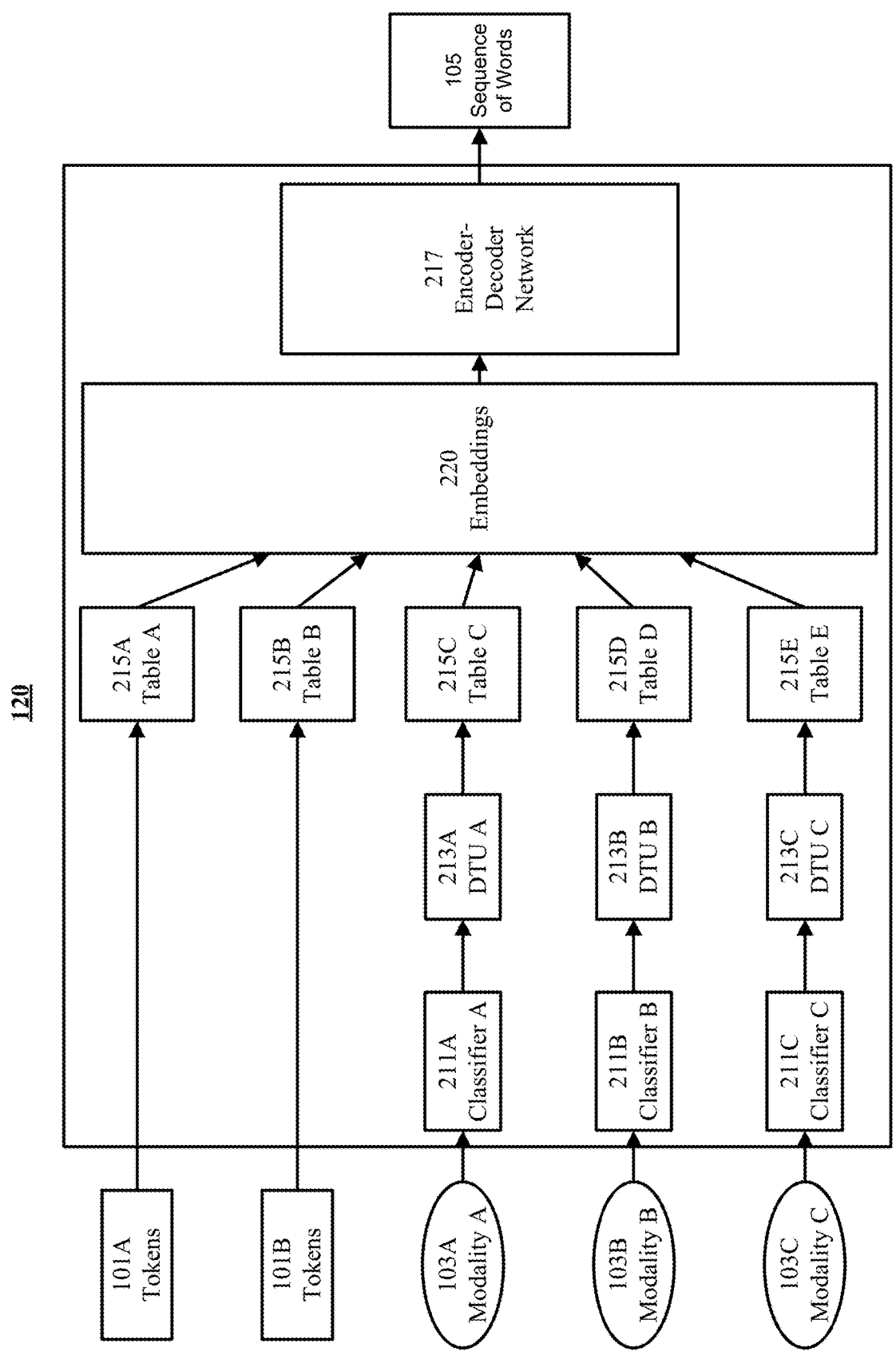
FIG. 2 illustrates an example data flow in the machine-learning framework to generate a sequence of words addressing the desired task based on multi-modal inputs.

FIG. 2 illustrates an example data flow in the machine-learning framework to generate a sequence of words addressing the desired task based on multi-modal inputs. Each of the one or more modalities 103A, 103B, or 103C may be processed by a corresponding classifier 211A, 211B, or 211C to produce a probability distribution for a plurality of categories associated with the classifier 211A, 211B, or 211C. The computing device 110 may determine a set of tokens for each of the one or more modalities 103A, 103B, or 103C by sampling one or more categories for the modality 103A, 103B, or 103C based on the probability distribution for the plurality of categories associated with the classifier 211A, 211B, or 211C. The computing device 110 may use a corresponding differentiable tokenization unit (DTU) 213A, 213B, or 213C for sampling. The computing device 110 may generate a plurality of embedding vectors 220 by mapping the one or more sets of tokens 101A and 101B and the set of tokens associated with each of the one or more modalities 103A, 103B, or 103C to an embedding space. Mapping a set of tokens to one or more embedding vectors in a d-dimensional embedding space may comprise looking up an embedding table 215A, 215B, 215C, 215D, or 215E corresponding to the set of tokens. The computing device 110 may process the plurality of embedding vectors 220 using an encoder-decoder network 217 to produce a sequence of words 105 addressing the desired task. Although this disclosure describes a particular data flow within a machine-learning framework to generate a sequence of words addressing a desired task based on multi-modal inputs, this disclosure contemplates any suitable data flow within a machine-learning framework to generate a sequence of words addressing a desired task based on multi-modal inputs.

Figure 3:
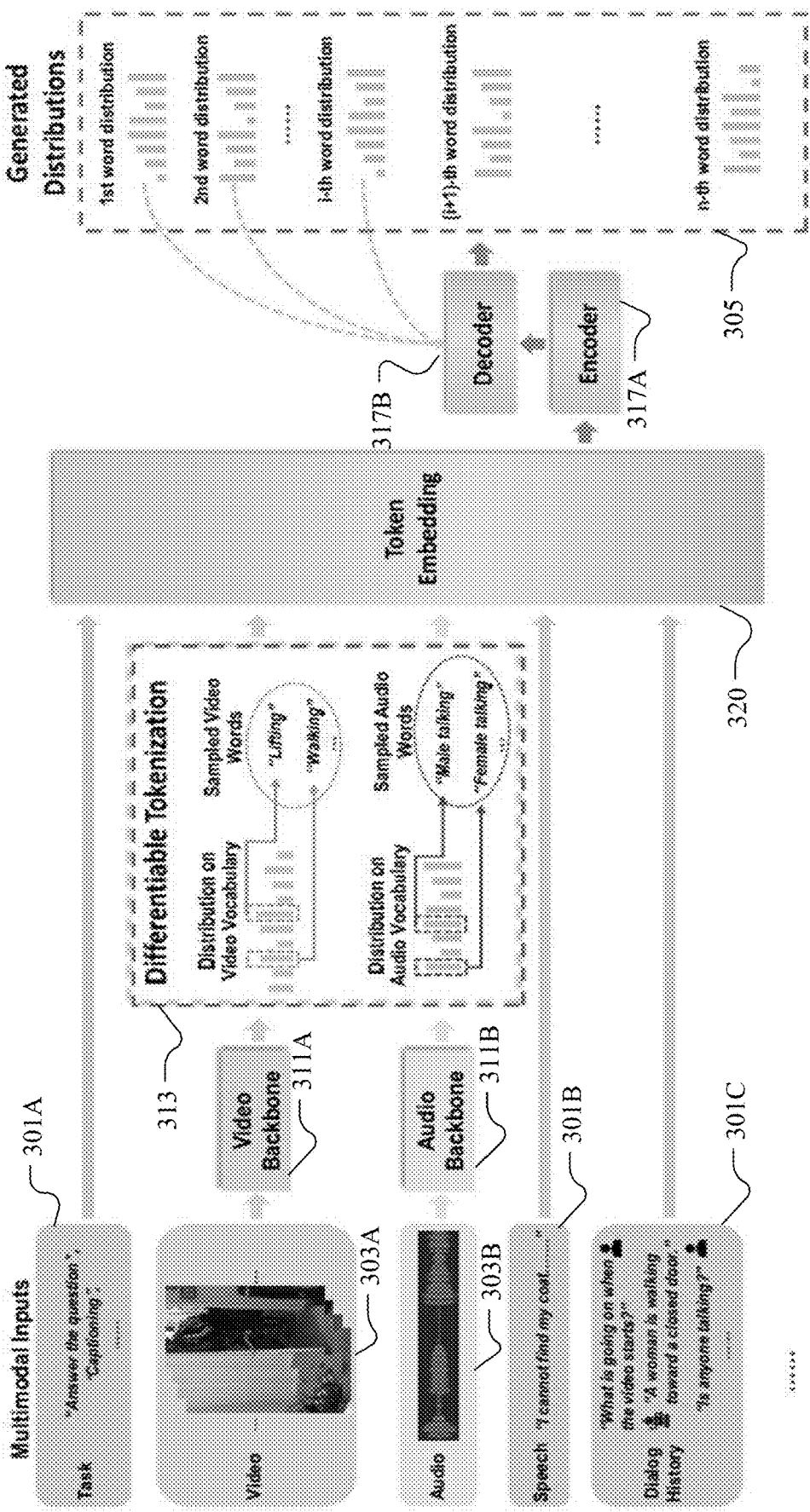
FIG. 3 illustrates an example processing of multi-modal inputs to generates a sequence of words addressing the desired task.

In particular embodiments, the computing device 110 may access one or more first sets of tokens associated with a desired task and one or more modalities associated with a context of the desired task. The desired task may comprise a caption describing an event, an answer to a given question related to the event, a question relative to the event, a context-aware dialog, or any suitable task. The one or more modalities may comprise video sensor data, audio sensor data, Inertial Measurement Unit (IMU) sensor data, light detection and ranging (lidar) sensor data, or any suitable sensor data. FIG. 3 illustrates an example processing of multi-modal inputs to generates a sequence of words addressing the desired task. As an example and not by way of limitation, illustrated in FIG. 3, the computing device 110 accesses three sets of tokens 301A, 301B, and 301C and two modalities 303A and 303B. The set of tokens 301A defines a desired task. For example, the set of tokens 301A may be "answer the question," "captioning," "audio-visual scene-aware dialog," or any other suitable set of tokens defining a desired task. The set of tokens 301B is a transcription of a conversation between persons captured in the scene. The set of tokens 301C is a previous dialog history. The set of tokens 301C may be provided when the set of tokens 301A is "audio-visual scene-aware dialog." In the example illustrated in FIG. 3, the computing device 110 has generated a response "a woman is walking toward a closed door" to a question "what is going on when the video starts?" from a user. The user continues to ask "is anyone talking?" The computing device 110 will generate a sequence of words that comprises a response to this question using the machine-learning framework 120. The sensor data 303A is a video data captured by a video sensor. The sensor data 303B is an audio data captured by an audio sensor. Although this disclosure describes accessing one or more sets of tokens associated with a desired task and one or more modalities associated with a context of the desired task in a particular manner, this disclosure contemplates accessing one or more sets of tokens associated with a desired task and one or more modalities associated with a context of the desired task in any suitable manner.

In particular embodiments, The computing device 110 may need to encode information from each modality to comprehensively understand multi-modal inputs. Previous approaches rely on extra cross-modal fusion modules for combining input signals from different modalities. Such approaches may introduce an unnecessary complexity for integrating different modalities. The computing device 110 may perform a multi-modal fusion by mapping the different input signals into a common semantic language space. Pre-trained modality-specific classifiers 211 that are trained to predict a large set of categories over predefined language vocabularies may be used. The modality-specific classifiers 211 may include a video classifier 311A trained to recognize a large collection of actions, or an audio classifier 311B trained to distinguish a broad set of sound categories. After that, the computing device 110 may utilize existing language embedding models to map the top textual categories predicted by each modality-specific classifier 211 into a common semantic language space.

In particular embodiments, the computing device 110 may determine a second set of tokens for each of the one or more modalities using a classifier network 211 and a differentiable tokenization unit 213 associated with the modality. Determining a set of tokens for each of the one or more modalities may comprise sampling one or more categories corresponding to the modality among a plurality of categories based on a probability distribution for the plurality of categories. The probability distribution for the plurality of categories may be generated by processing the modality with a classifier network 211 associated with the modality. The sampling may comprise a categorical reparameterization with Gumbel-Softmax and/or a differentiable approximation of tokenization. Specifically, the computing device 110 may re-parameterize the predicted probability distribution $p_m \in \mathbb{R}^{1 \times c_m}$ by adding Gumbel noise $g_m \in \mathbb{R}^{1 \times c_m}$ to the predicted probability distribution, where $g_m = -\log(-\log(u))$ with $u \sim$ Uniform (0, 1). The computing device 110 may sample the top $K_m$ categories from the re-parameterized distribution $\tilde{P}_m \in \mathbb{R}^{1 \times c_m}$ for each modality m. With this re-parameterized distribution, selecting the top $K_m$ categories are equivalent to sampling $K_m$ categories from the original distribution. The sampling may be performed by the differentiable tokenization unit 213. However, the process of selecting the top $K_m$ categories is still not differentiable. To address this issue, a Straight-Through Estimator may be used. Specifically, during forward propagation, the computing device 110 may sample top $K_m$ categories as described above. Instead, during a backward propagation, the computing device 110 may estimate the gradient for each category c as:

$$G \approx \nabla W_m \frac{\exp(\log p_m(c \mid x) + g_m(c))}{\sum_{c'}^{|c_m|} \exp(\log p_m(c' \mid x) + g_m(c'))}$$

Where $W_m \in \mathbb{R}^{C_m \times D}$ is a learned D-dimensional embedding of $C_m$ category tokens. This enables an end-to-end training of the entire system including the modality-specific classifiers 211. As an example and not by way of limitation, continuing with a prior example illustrated in FIG. 3, the computing device 110 may produce a probability distribution for a plurality of categories for each of the modalities 303A and 303B. The computing device 110 may sample one or more categories from each of plurality of categories at the differentiable tokenization unit 313 as described above. Although this disclosure describes determining a set of tokens for each of the one or more modalities in a particular manner, this disclosure contemplates determining a set of tokens for each of the one or more modalities in any suitable manner.

In particular embodiments, the computing device 110 may generate a plurality of embedding vectors by mapping the one or more first sets of tokens and the second set of tokens associated with each of the one or more modalities to an embedding space. Mapping a set of tokens to one or more embedding vectors in a d-dimensional embedding space may comprise looking up an embedding table corresponding to the modality. FIG. 2 illustrates five mapping tables 215A, 215B, 215C, 215D, and 215E corresponding to sets of tokens 101A and 101B and sets of tokens generated based on modalities 103A, 103B, and 103C. In particular embodiments, a first embedding table corresponding to a first modality may be different from a second embedding table corresponding to a second modality. One or more embedding vectors mapped from a set of tokens may have a pre-determined relative position among the plurality of embedding vectors. One or more embedding vectors corresponding to a first set of tokens may be separated by a special 'separator' token from one or more embedding vectors corresponding to a second set of tokens within the plurality of embedding vectors. As an example and not by way of limitation, continuing with a prior example illustrated in FIG. 3, the computing device 110 generates one or more embedding vectors for the set of tokens 301A defining the desired task. The computing device 110 generates one or more embedding vectors for the set of tokens 301B, a transcription of spoken language. The computing device 110 generates one or more embedding vectors for the set of tokens 301C, a dialog history. The computing device 110 generates one or more embedding vectors for the set of tokens generated based on the video data 303A. The computing device 110 generates one or more embedding vectors for the set of tokens generated based on the audio data 303B. The computing device 110 may use different mapping table for each set of tokens. The computing device 110 may construct a plurality of embedding vectors 320 by combining the one or more embedding vectors for each set of tokens. One or more embedding vectors corresponding to a first set of tokens are separated from one or more embedding vectors corresponding to a second set of tokens by a separator embedding vector. Although this disclosure describes generating a plurality of embedding vectors by mapping each set of tokens to an embedding space in a particular manner, this disclosure contemplates generating a plurality of embedding vectors by mapping each set of tokens to an embedding space in any suitable manner.

In particular embodiments, the computing device 110 may produce a sequence of words addressing the desired task by processing the plurality of embedding vectors with an encoder-decoder network. An encoder of the encoder-decoder network may generate a latent representation for the desired task by processing the plurality of embedding vectors. A decoder of the encoder-decoder network may generate a word at a time in an auto-regressive manner by processing the latent representation. Each generated word may be selected from a word dictionary based on a probability associated with each word in the dictionary. The decoder may take $1^{st}$ to $k^{th}$ selected word as a part of input for generating a $k+1^{st}$ word in the sequence of words. As an example and not by way of limitation, continuing with a prior example illustrated in FIG. 3, the computing device 110 generates a latent representation for the desired task by processing the plurality of embedding vectors 320 with an encoder 317A of an encoder-decoder network. The decoder 317B of the encoder-decoder network generates a probability distribution 305 for words in a dictionary for each word in the output sequence of words. For each word in the output sequence of words, the computing device 110 selects a word based on the generated probability distribution 305. The decoder 317B takes a $k^{th}$ selected word as a part of input to generate a probability distribution for a $k+1^{st}$ word in the sequence of words. Although this disclosure describes producing a sequence of words addressing the desired task in a particular manner, this disclosure contemplates producing a sequence of words addressing the desired task in any suitable manner.

Figure 4:
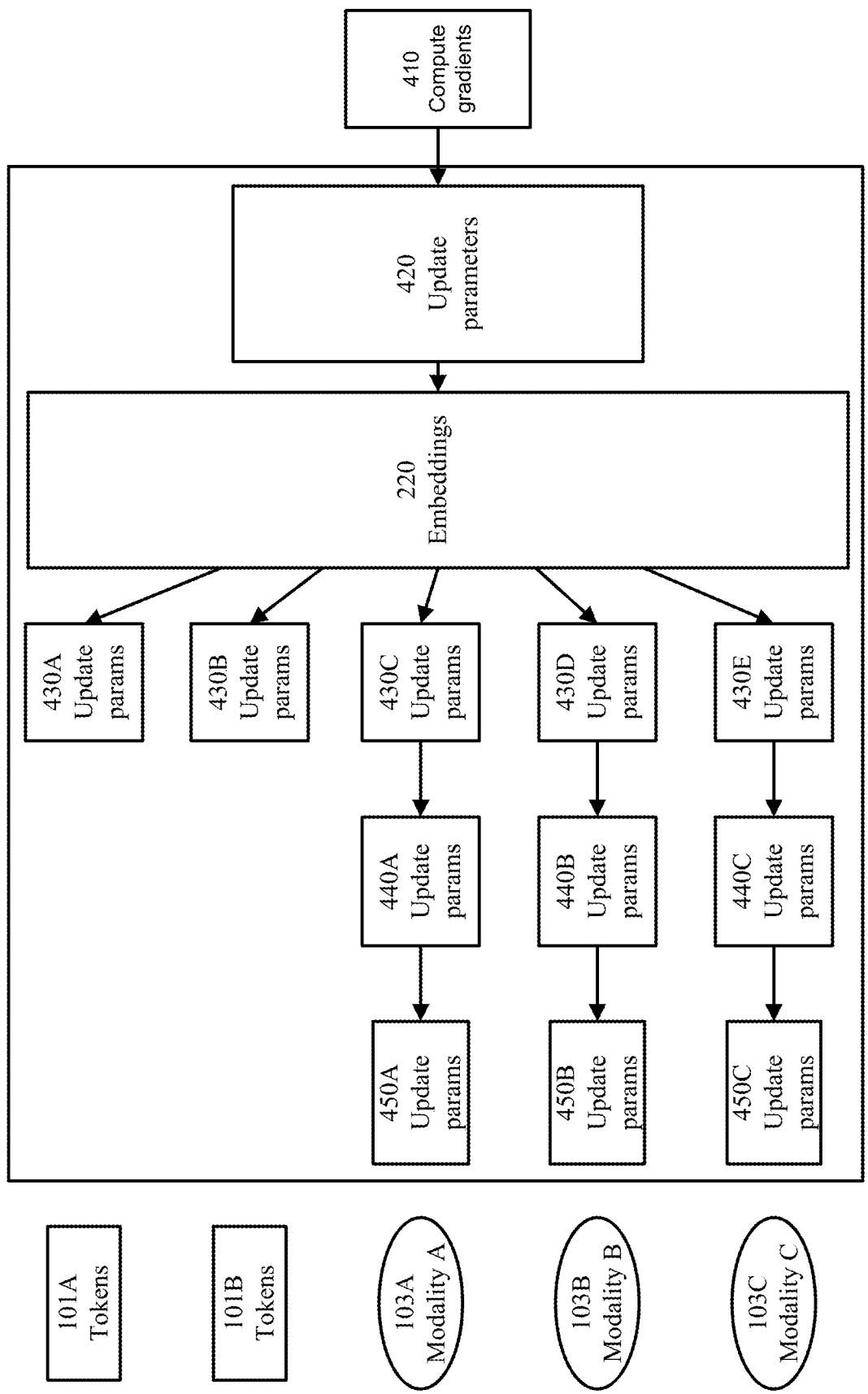
FIG. 4 illustrates an example backward propagation process during a training of the machine-learning framework.

In particular embodiments, the computing device 110 may train the entire machine-learning framework 120 including classifier networks 211 associated with the one or more modalities, embedding tables 215 associated with each set of tokens, and the encoder-decoder network 217. FIG. 4 illustrates an example backward propagation process during a training of the machine-learning framework. At step 410, the computing device may calculate a loss based on a comparison between a ground truth sequence of words addressing a desired task with a sequence of words generated from the decoder of the encoder-decoder network 217. The computing device may compute gradients for trainable parameters in the machine-learning framework 120. At step 420, the computing device 110 may update parameters of the encoder-decoder network 217 based on the computed gradients. At steps 430A, 430B, 430C, 430D, and 430E, the computing device 110 may update parameters of each of the embedding tables 215A, 215B, 215C, 215D, and 215E. After training the machine-learning framework 120, two different embedding tables may map a single token to two different embedding vectors because parameters of each embedding table are updated separately. At steps 440A, 440B, 440C, the computing device may update parameters of differentiable tokenization units 213A, 213B, and 213C. For updating the parameters of the differentiable tokenization units, a gradient for each of the plurality of categories for each differentiable tokenization unit may be estimated using a Straight-Through Estimator. In particular embodiments, updating parameters of differentiable tokenization units 213A, 213B, and 213C may be skipped. Then, the gradient for each of the plurality of categories for each differentiable tokenization may be just passed. At steps 450A, 450B, and 450C, the computing device may update parameters of the classifier networks 211A, 211B, and 211C. Although this disclosure describes training a machine-learning framework for generating a sequence of words addressing a desired task based on multi-modal inputs in a particular manner, this disclosure contemplates training a machine-learning framework for generating a sequence of words addressing a desired task based on multi-modal inputs in any suitable manner.

In particular embodiments, the computing device 110 may, at a beginning of a training procedure, initialize each classifier network 211 associated with each of the one or more modalities, each embedding table 215 corresponding to each set of tokens, and the encoder-decoder network 217 with pre-trained models. During the training procedure, the classifier networks, the embedding tables, and the encoder-decoder network may be updated through backward propagations as described above. As an example and not by way of limitation, continuing with a prior example illustrated in FIG. 3, at a beginning of a training of the machine-learning framework 120, the classifier network 311A may be initialized with a video classifier model trained to recognize a large collection of actions. The classifier network 311B may be initialized with an audio classifier model trained to distinguish a broad set of sound categories. The embedding tables for the sets of tokens 301A, 301B, and 301C and the sets of tokens generated based on sensor data 303A and 303B may be initialized with an existing language embedding model. In particular embodiments, the embedding tables may be identical to each other at the beginning of the training. However, the embedding tables are updated independently while the machine-learning framework 120 is trained. The encoder 317A and the decoder 317B of the encoder-decoder network may be initialized with a pre-trained text transformer network, such as T5-base. Although this disclosure describes initializing each networks within a machine-learning framework with pre-trained models at a beginning of a training in a particular manner, this disclosure contemplates initializing each networks within a machine-learning framework with pre-trained models at a beginning of a training in any suitable manner.

In particular embodiments, during the backward propagations, a gradient for each of the plurality of categories for each of differentiable tokenization units 213 may be estimated using a Straight-Through Estimator. The computing device 110, during a backward propagation, may estimate the gradient for each category c as:

$$G \approx \nabla W_m \frac{\exp(\log p_m(c \mid x) + g_m(c))}{\sum_{c'}^{|c_m|} \exp(\log p_m(c' \mid x) + g_m(c'))}$$

Where $W_m \in \mathbb{R}^{C_m \times D}$ is a learned D-dimensional embedding of $C_m$ category tokens. This may enable an end-to-end training of the entire system including the modality-specific classifiers 211. Although this disclosure describes estimating a gradient for each of the plurality of categories for each of the differentiable tokenization units in a particular manner, this disclosure contemplates estimating a gradient for each of the plurality of categories for each of the differentiable tokenization units in any suitable manner.

In particular embodiments, the computing device 110 may calculate a loss based on a comparison between a ground-truth sequence of words addressing the desired task with a sequence of words generated by the decoder of the encoder-decoder network. A teacher-forcing technique may be used for calculating the loss, which means that the computing device 110 may replace the decoding history with ground-truth words in the corresponding positions. In other words, the computing device may generate a $k^{th}$ with providing a sub-sequence of words from a first word to a $k$-$1^{st}$ word in the ground truth sequence to the decoder as input. The computing device may compute a standard cross-entropy loss. The machine-learning framework 120 supports generation of a sequence of words with variable length. Although this disclosure describes calculating a loss based on a comparison between a ground-truth sequence of words addressing the desired task with a sequence of words generated by the decoder of the encoder-decoder network in a particular manner, this disclosure contemplates calculating a loss based on a comparison between a ground-truth sequence of words addressing the desired task with a sequence of words generated by the decoder of the encoder-decoder network in any suitable manner.

Figure 5:
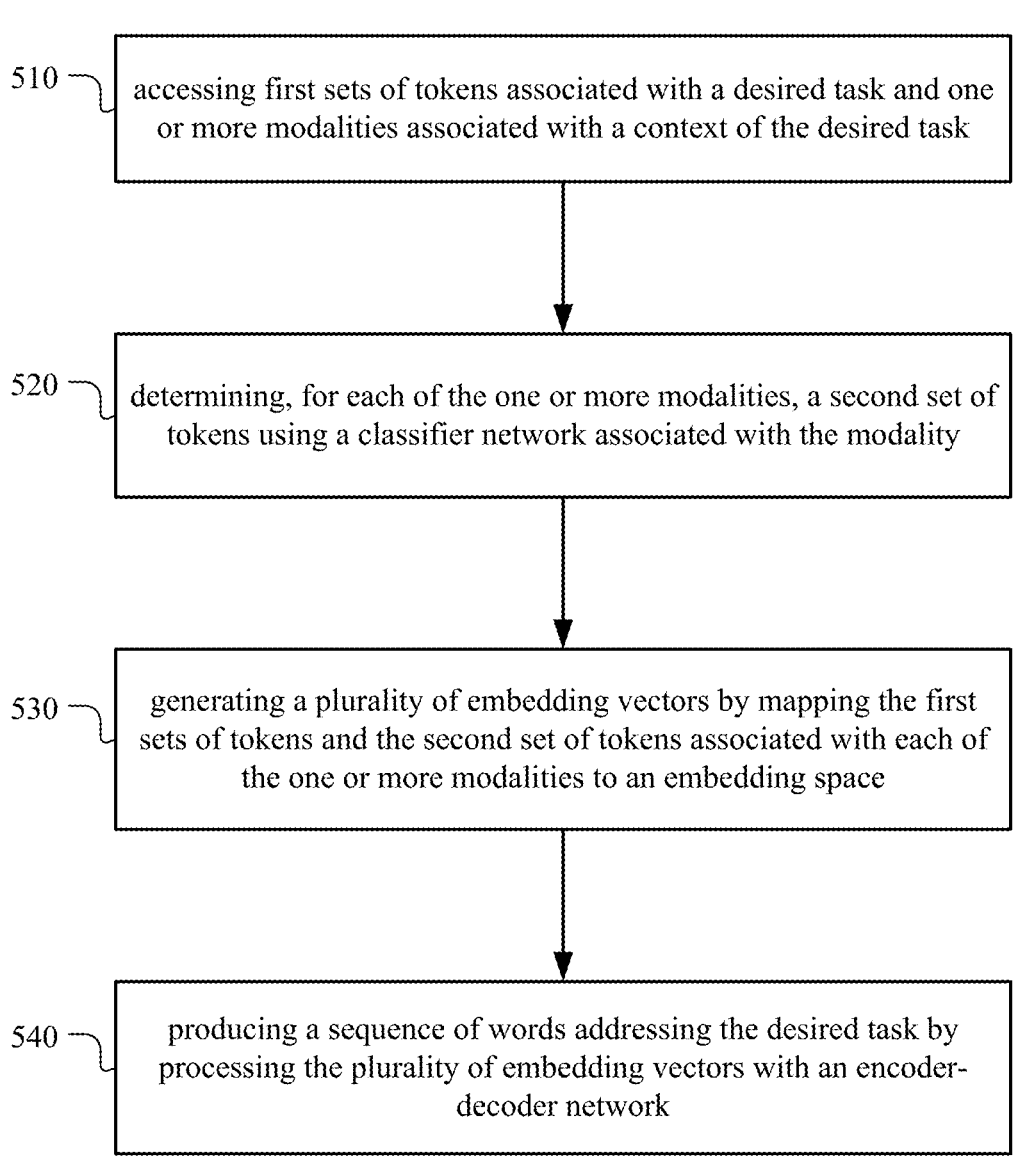
FIG. 5 illustrates an example method for generating a sequence of words addressing a desired task based on one or more sets of tokens associated with the desired task and one or more sensor data associated with a context of the desired task.

FIG. 5 illustrates an example method 500 for generating a sequence of words addressing a desired task based on one or more sets of tokens associated with the desired task and one or more sensor data associated with a context of the desired task. The method may begin at step 510, where the computing device 110 may access first sets of tokens associated with a desired task and one or more modalities associated with a context of the desired task. At step 520, the computing device 110 may determine a second set of tokens for each of the one or more modalities using a classifier network associated with the modality. At step 530, the computing device 110 may generate a plurality of embedding vectors by mapping the first sets of tokens and the second set of tokens associated with each of the one or more modalities to an embedding space. At step 540, the computing device 110 may produce a sequence of words addressing the desired task by processing the plurality of embedding vectors with an encoder-decoder network. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for generating a sequence of words addressing a desired task based on one or more sets of tokens associated with the desired task and one or more sensor data associated with a context of the desired task including the particular steps of the method of FIG. 5, this disclosure contemplates any suitable method for generating a sequence of words addressing a desired task based on one or more sets of tokens associated with the desired task and one or more sensor data associated with a context of the desired task including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Evaluation

The followings show performance comparisons between the machine-learning framework, VX2TEXT, disclosed herein with a number of state-of-the-art on three separate benchmarks.

Audio-Visual Scene-Aware Dialog: FIG. 6A illustrates comparative results on Audio-Visual Scene-Aware Dialog. VX2TEXT significantly improves over existing methods both with and without text caption as part of the inputs. Note that the state-of-the-art MTN system uses complex cross-modal attentional modules to fuse the information from different modalities. MTNTMT leverages complex auxiliary losses to align the embedding spaces of MTN. However, even without text caption, which is a very strong information source, VX2TEXT achieves already better performance than MTN. When adding text caption to the input, the performance of VX2TEXT is further boosted and significantly outperforms MTN-TMT. The results further demonstrate the effectiveness of the simple scheme for modality integration of the framework disclosed herein.

Video Question Answering: Since many methods on Video Question Answering use object/frame-level features, detected object categories are added as an extra modality of input for the evaluation with VX2TEXT for a fair comparison. Due to the complexity of training object detectors, Frozen Tokenization is used. Differentiable Tokenization is not used for this evaluation. FIG. 6B illustrates comparative results on Video Question Answering. The results show that VX2TEXT significantly outperforms all previous methods on both the validation set and the test set when training is done without additional multimodal pretext training data. On the test set, VX2TEXT yields an improvement of 1.4% compared to the previous state-of-the-art, represented by the HERO system which adopts an expensive multimodal pretext training on 7.6M additional samples. When both models are trained without multimodal pretext, VX2TEXT outperforms HERO by 4.7%.

Video Captioning: FIG. 6C illustrates comparative results on Video Captioning. VX2TEXT significantly outperforms the state-of-the-art MMT system. Without pretraining, HERO achieves performance comparable to that of MMT and inferior to VX2TEXT. With multimodal pretraining on additional 7.6M samples, HERO does only slightly better than VX2TEXT. VX2TEXT also shows significant generalization on the test set. Note that, as done on Video Question Answering, object detection predictions are added as an input modality for VX2TEXT since the methods considered in the comparison all have access to frame-level features.

Vector Spaces and Embeddings

Figure 7:
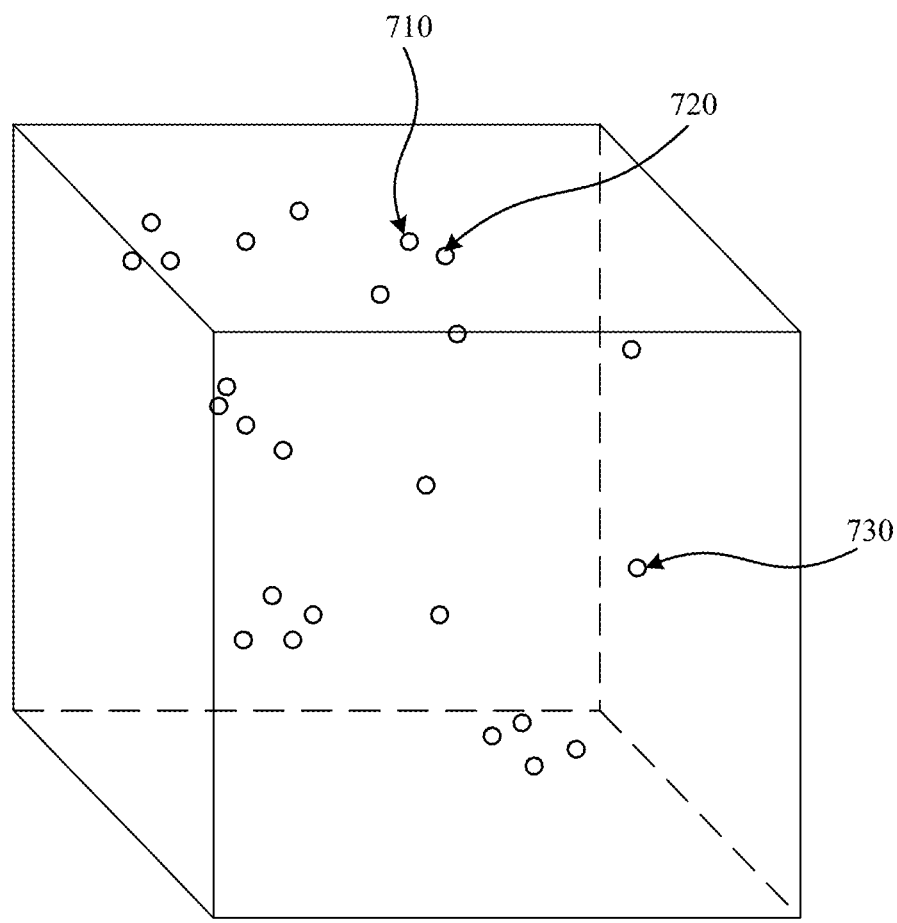
FIG. 7 illustrates an example view of an embedding space.

FIG. 7 illustrates an example view of a vector space 700. In particular embodiments, an object or an n-gram may be represented in a d-dimensional vector space, where d denotes any suitable number of dimensions. Although the vector space 700 is illustrated as a three-dimensional space, this is for illustrative purposes only, as the vector space 700 may be of any suitable dimension. In particular embodiments, an n-gram may be represented in the vector space 700 as a vector referred to as a term embedding. Each vector may comprise coordinates corresponding to a particular point in the vector space 700 (i.e., the terminal point of the vector). As an example and not by way of limitation, vectors 710, 720, and 730 may be represented as points in the vector space 700, as illustrated in FIG. 7. An n-gram may be mapped to a respective vector representation. As an example and not by way of limitation, n-grams $t_1$ and $t_2$ may be mapped to vectors $\vec{v_1}$ and $\vec{v_2}$ in the vector space 700, respectively, by applying a function 71 defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 700. In particular embodiments, an n-gram may be mapped to a vector representation in the vector space 700 by using a machine leaning model (e.g., a neural network). The machine learning model may have been trained using a sequence of training data (e.g., a corpus of objects each comprising n-grams).

In particular embodiments, an object may be represented in the vector space 700 as a vector referred to as a feature vector or an object embedding. As an example and not by way of limitation, objects $e_1$ and $e_2$ may be mapped to vectors $\vec{v_1}$ and $\vec{v_2}$ in the vector space 700, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function 71 may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 700. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 700. As an example and not by way of limitation, vector 710 and vector 720 may correspond to objects that are more similar to one another than the objects corresponding to vector 710 and vector 730, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 8:
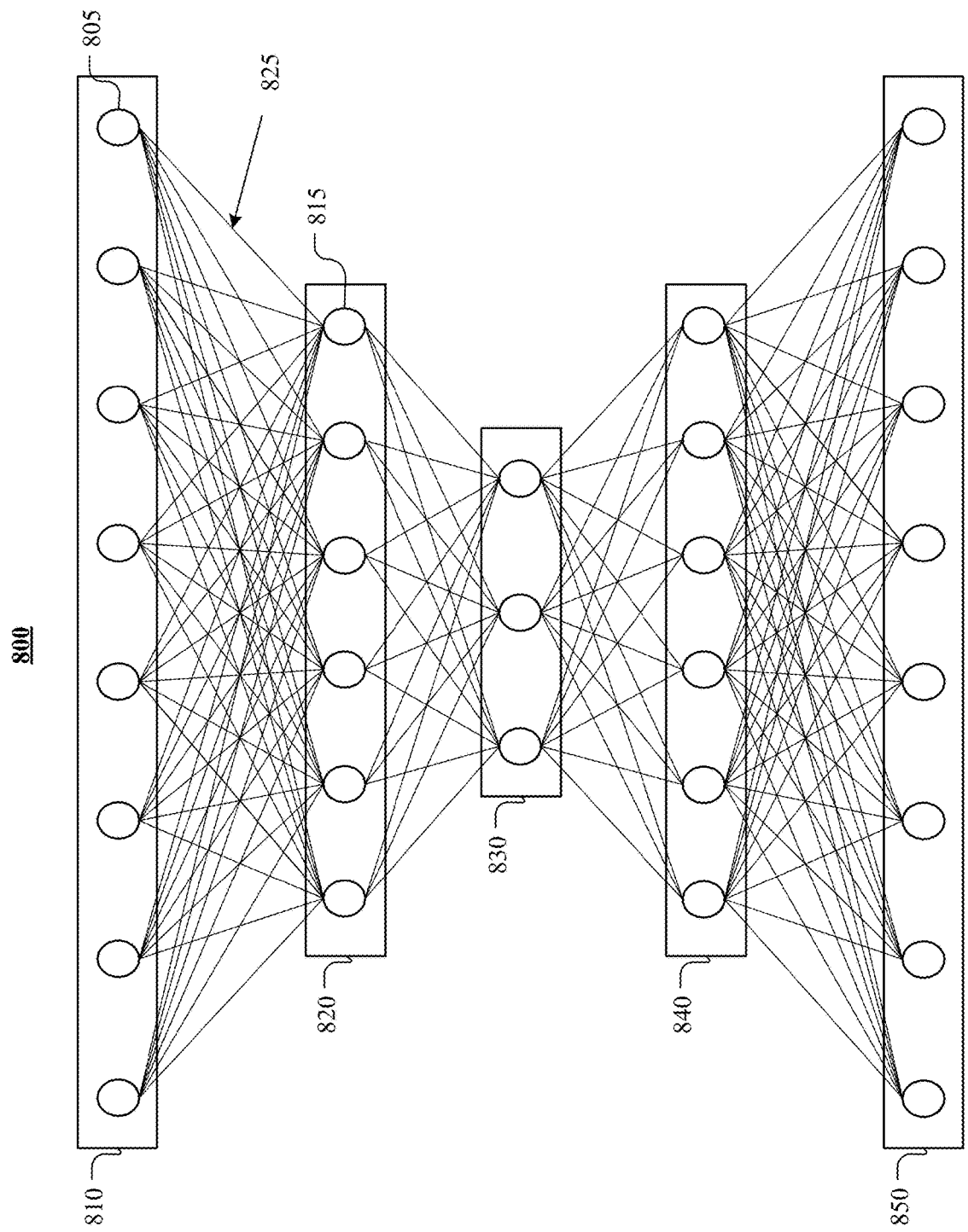
FIG. 8 illustrates an example artificial neural network.

FIG. 8 illustrates an example artificial neural network ("ANN") 800. In particular embodiments, an ANN may refer to a computational model comprising one or more nodes. Example ANN 800 may comprise an input layer 810, hidden layers 820, 830, 840, and an output layer 850. Each layer of the ANN 800 may comprise one or more nodes, such as a node 805 or a node 815. In particular embodiments, each node of an ANN may be connected to another node of the ANN. As an example and not by way of limitation, each node of the input layer 810 may be connected to one of more nodes of the hidden layer 820. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 8 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 8 depicts a connection between each node of the input layer 810 and each node of the hidden layer 820, one or more nodes of the input layer 810 may not be connected to one or more nodes of the hidden layer 820.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 820 may comprise the output of one or more nodes of the input layer 810. As another example and not by way of limitation, the input to each node of the output layer 850 may comprise the output of one or more nodes of the hidden layer 840. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1+e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)$=max (0, $s_k$), or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 825 between the node 805 and the node 815 may have a weighting coefficient of 0.4, which may indicate that 0.4 multiplied by the output of the node 805 is used as an input to the node 815. As another example and not by way of limitation, the output $y_k$ of node k may be $y_k$=$F_k$ ($s_k$), where $F_k$ may be the activation function corresponding to node k, $s_k$=$\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 800 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Systems and Methods

Figure 9:
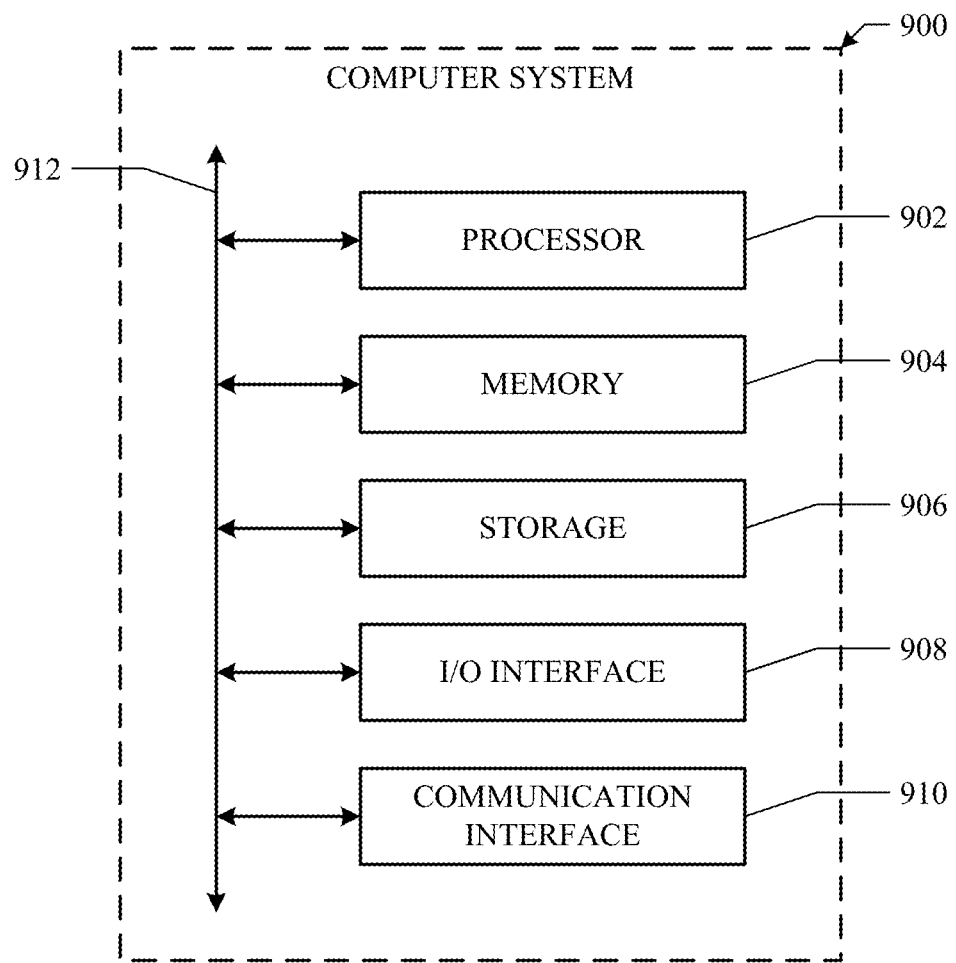
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   accessing at least one first set of tokens associated with a desired task and one or more modalities associated with a context of the desired task;
   determining, for the one or more modalities, a second set of tokens using a classifier network associated with at least one modality;
   generating a plurality of embedding vectors comprising a first set of embedding vectors mapped to the at least one first set of tokens and a second set of embedding vectors mapped to the second set of tokens, the at least one first set of tokens and the second set of tokens associated with the one or more modalities, wherein the first set of embedding vectors and the second set of embedding vectors are different and are mapped to an embedding space; and
   producing a sequence of words addressing the desired task based on determining probability distributions of the words to determine whether to select the words for the sequence and based on processing the plurality of embedding vectors with an encoder-decoder network.

2. The method of claim 1, wherein the desired task comprises a caption describing an event, an answer to a given question related to the event, a question relative to the event, or a context-aware dialog.

3. The method of claim 1, wherein the one or more modalities comprise video sensor data, audio sensor data, Inertial Measurement Unit (IMU) sensor data, or light detection and ranging (lidar) sensor data.

4. The method of claim 1, wherein the plurality of embedding vectors comprise a pre-determined relative position among the plurality of embedding vectors.

5. The method of claim 1, wherein an encoder of the encoder-decoder network generates a latent representation by processing the plurality of embedding vectors.

6. The method of claim 5, wherein a decoder of the encoder-decoder network produces a word at a time by processing the latent representation, wherein the produced word is selected from a word dictionary based on a probability associated with one or more words in the word dictionary.

7. The method of claim 6, wherein the decoder takes a kth produced word as input for producing a $k+1^{st}$ word in the sequence of words.

8. The method of claim 1, wherein determining a set of tokens for one or more modalities comprises sampling one or more categories corresponding to a modality among a plurality of categories based on a probability distribution associated with the plurality of categories generated by processing the at least one modality with the classifier network associated with the at least one modality.

9. The method of claim 8, wherein the sampling comprises a categorical reparameterization with Gumbel-Softmax or a differentiable approximation of tokenization.

10. The method of claim 8, wherein sampling one or more categories corresponding to the modality among the plurality of categories based on a probability distribution for the plurality of categories is performed by a differentiable tokenization unit.

11. The method of claim 10, wherein mapping a set of tokens belonging to a modality to one or more embedding vectors in a d-dimensional embedding space comprises looking up an embedding table corresponding to the at least one modality.

12. The method of claim 11, wherein a first embedding table corresponding to a first modality is different from a second embedding table corresponding to a second modality.

13. The method of claim 11, wherein, at a beginning of a training procedure, the classifier network associated with embedding tables, of the at least one modality, corresponding to the at least one first set of tokens and the second set of tokens, and the encoder-decoder network are initialized with pre-trained models.

14. The method of claim 13, wherein, during the training procedure, the classifier network, the embedding tables, and the encoder-decoder network are updated through backward propagations.

15. The method of claim 14, wherein, during the backward propagations, a gradient for the plurality of categories for the one or more modalities is estimated using a Straight-Through Estimator.

16. The method of claim 14, wherein, a loss is calculated based on a comparison between a ground-truth sequence of words addressing the desired task with a sequence of words generated by the decoder of the encoder-decoder network.

17. The method of claim 16, wherein a partial loss for a $k^{th}$ word is calculated based on a comparison between a $k^{th}$ word in the ground-truth sequence of words and a $k^{th}$ generated word in an instance in which a sub-sequence of words from a first word to a $k-1^{st}$ word in the ground truth sequence of words is provided to the decoder as input.

18. One or more computer-readable non-transitory storage media embodying software that is operable when executed to:

access at least one first set of tokens associated with a desired task and one or more modalities associated with a context of the desired task;
determine, for the one or more modalities, a second set of tokens using a classifier network associated with at least one modality;
generate a plurality of embedding vectors comprising a first set of embedding vectors mapped to the at least one first set of tokens and a second set of embedding vectors mapped to the second set of tokens, the at least one first set of tokens and the second set of tokens associated with the one or more modalities, wherein the first set of embedding vectors and the second set of embedding vectors are different and are mapped to an embedding space; and
produce a sequence of words addressing the desired task based on determining probability distributions of the words to determine whether to select the words for the sequence and based on processing the plurality of embedding vectors with an encoder-decoder network.

19. The media of claim 18, wherein the desired task comprises a caption describing an event, an answer to a given question related to the event, a question relative to the event, or a context-aware dialog.

20. A system comprising:
one or more processors; and
a non-transitory memory coupled to the one or more processors comprising instructions executable by the one or more processors, the one or more processors operable when executing the instructions to:
access at least one first set of tokens associated with a desired task and one or more modalities associated with a context of the desired task;
determine, for the one or more modalities, a second set of tokens using a classifier network associated with at least one modality;
generate a plurality of embedding vectors comprising a first set of embedding vectors mapped to the at least one first set of tokens and a second set of embedding vectors mapped to the second set of tokens, the at least one first set of tokens and the second set of tokens associated with the one or more modalities, wherein the first set of embedding vectors and the second set of embedding vectors are different and are mapped to an embedding space; and
produce a sequence of words addressing the desired task based on determining probability distributions of the words to determine whether to select the words for the sequence and based on processing the plurality of embedding vectors with an encoder-decoder network.

* * * * *